June 14, 1949. A. I. DAHL 2,472,808
THERMOCOUPLE JUNCTION WITH RADIATION SHIELD
Filed July 1, 1946 2 Sheets-Sheet 1
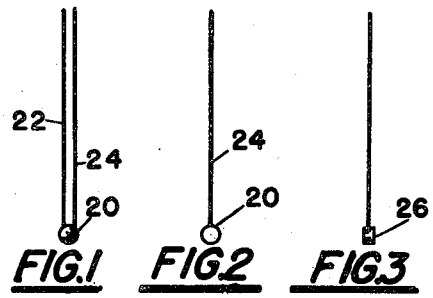
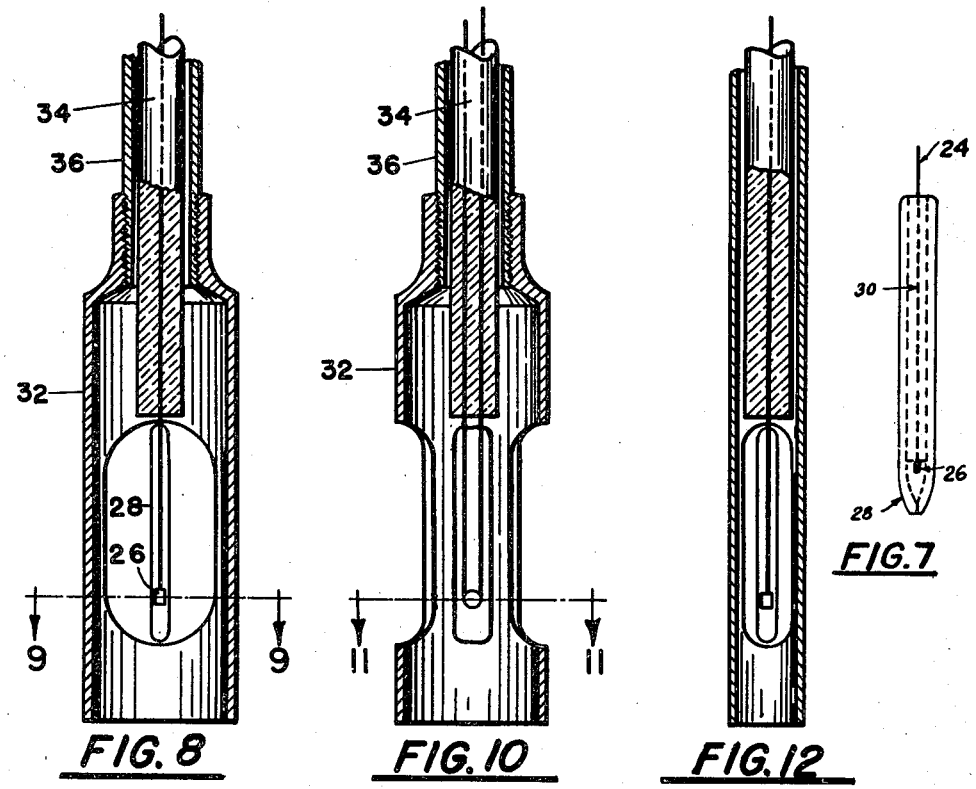
*INVENTOR.*
ANDREW I. DAHL
BY *M. Hayes*
ATTORNEY

June 14, 1949.  A. I. DAHL  2,472,808
THERMOCOUPLE JUNCTION WITH RADIATION SHIELD
Filed July 1, 1946  2 Sheets-Sheet 2

INVENTOR.
ANDREW I. DAHL
BY
ATTORNEY

UNITED STATES PATENT OFFICE 2,472,808

THERMOCOUPLE JUNCTION WITH RADIATION SHIELD

Andrew I. Dahl, Arlington, Va.

Application July 1, 1946, Serial No. 680,783

5 Claims. (Cl. 136—4)

(Granted under the act of March 3, 1883, as amended April 30, 1928; 370 O. G. 757)

This invention relates to shielded thermocouples and in particular to a shielded type of thermocouple of which the physical dimensions are relatively small so that the shielded thermocouple is readily insertible into a comparatively small space.

Radiation shields for thermocouples have been widely used in the past. These have normally had the form of one or more concentric tubes, the nearest shield being at a considerable distance from the working junction. In applications where space for thermocouples is limited and/or where many junctions must be used to get an accurate, average temperature, previously used methods of shielding make the over-all dimensions of the temperature measuring device too great for practical use.

With this limitation in view, it is, therefore, one object of this invention to provide a shielded thermocouple in which the physical dimensions of the shielded junction are only slightly greater than those of the junction itself.

It is a further object of this invention to provide a shielded thermocouple of such physical dimensions that it can be introduced in large numbers in restricted spaces.

It is an additional object of this invention to provide a shielded thermocouple which is as free from radiation loss as those of larger size.

It is a still further object of this invention to provide a shielded thermocouple which because of low radiation loss indicates the true temperature with substantial accuracy.

It is also an object of this invention to provide a shielded thermocouple which is less subject to damage by vibration than present art thermocouples, and Other objects will be apparent to those skilled in the art from the following description, claims and the accompanying drawings which are illustrative of a preferred method of construction of a shielded thermocouple in accordance with this invention.

In order that a clearer conception may be had of this invention, reference is now made to the drawings in which:

Figure 1 is a front elevation and top plan view of a base metal thermocouple;

Figure 2 is a side elevation and top plan view of the same;

Figure 3 is a side elevation and top plan view showing the juncture of the two leads flattened or reduced in thickness.

Figure 7 is a side elevation showing the completely shielded thermocouple.

Figures 8 and 10 are two elevations showing the shielded thermocouple mounted on a conventional insulating tube in conjunction with a steel tube and casing, the whole assembly being adapted to function as a gas temperature pyrometer.

Figure 9 is a sectional view taken along line 9—9 in Figure 8 looking in the direction indicated by the arrows, and Figure 11 is a sectional view taken along line 11—11 in Figure 10 looking in the direction indicated by the arrows.

Figure 12 is a modification of the structure shown by Figures 8 and 10.

When a thermocouple is placed in a stream of hot gas flowing through a pipe whose walls are cooler than the gas, heat will be transferred from the gas to the thermocouple junction by convection and from the junction to the walls by radiation. The junction will attain an equilibrium temperature representing the state at which the heat transferred to the junction by convection is exactly balanced by that transferred from the junction to the walls by radiation. Since the heat radiated from the junction is directly proportional to the surface emissivity, the temperature of the junction will approach that of the gas as the emissivity is reduced.

Thermocouples generally employed are of the base-metal type, such as Chromel-Alumel or iron-constantan. These alloys are oxidized in making the junctions, or soon become oxidized in service, so that the surface emissivity of the normal junction is 85 to 90%. By surrounding such a junction with a radiation shield of low emissivity, the heat loss by radiation can be reduced.

Since the emissivity of bright silver, for example, is about 5% at 1500° F., good shielding of a junction with this material will reduce the radiation loss from the junction by a factor of 18.

Referring again to the drawings, Figures 1 and 2 show the details of a typical base-metal thermocouple junction for use where space is limited. The junction itself is made by one of the well-known methods of autogenous welding or fusing together the ends of the two thermocouple wires 22 and 24 into a small bead 20. The composition of parts 22 and 24 are any pair of elements having suitable thermoelectric properties, such as iron and constantan, Chromel and Alumel, platinum and an alloy of platinum with rhodium, or many others. Bead 20 is worked down mechanically into a small, thin disc, whose faces are approximately parallel to the plane of the wires as shown at 26 in Figure 3.

Figures 4, 5, 6:
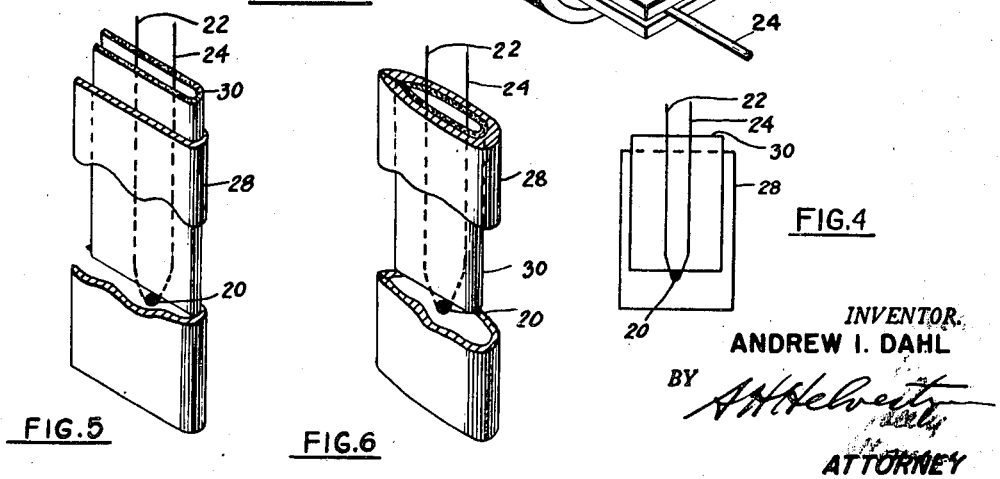
Figure 4 is a front elevation showing the first step in placing the shield around the thermocouple junction.
Figures 5 and 6 show successive steps in folding the silver radiation sheet with the sheet of insulating mica around the thermocouple junction.

A sheet of material 28 of low emissivity is folded and placed over the junction plus a short length of the wires adjacent to the junction as shown in Figures 4 and 5. A sheet of electrical insulating material 30, such as thin mica, is folded and inserted to provide electrical insulation between the shield 28 and the wires. The low-emissivity shield is then folded tightly around the junction and insulation by mechanical means, the edges being united by an appropriate method such as crimping, and the unit is worked smooth if desired, as shown in Figures 6 and 7. Good thermal contact between the shield and both wires and junction is desirable, because it reduces the time lag of the junction and the heat loss from the junction by conduction along the wires. The present construction is ideal for accomplishing the desired thermal contact, since the shield may be pressed very tightly around the junction to eliminate air spaces, and since the insulation may be made very thin because the voltage involved is infinitesimal.

As one example, the shield 28 may be made of silver for application up to 1500° F. In the range 1500 to above 2000° F., platinum may be used. Since the surface emissivity of platinum is about three times that of silver in the high temperature range, silver is to be preferred for temperatures below 1500° F. At low temperatures aluminum may be used.

Figure 14:
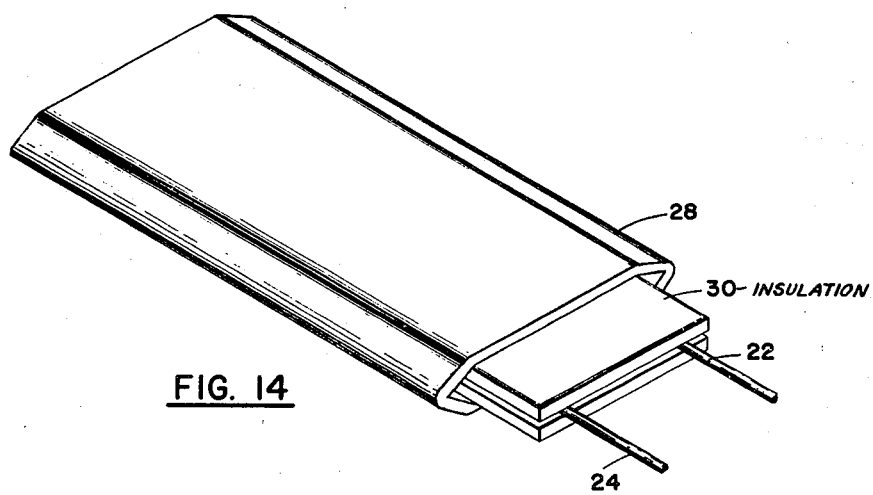
Fig. 14 is an enlarged isometric view showing the embodiment in fully compacted form.
Figure 13:
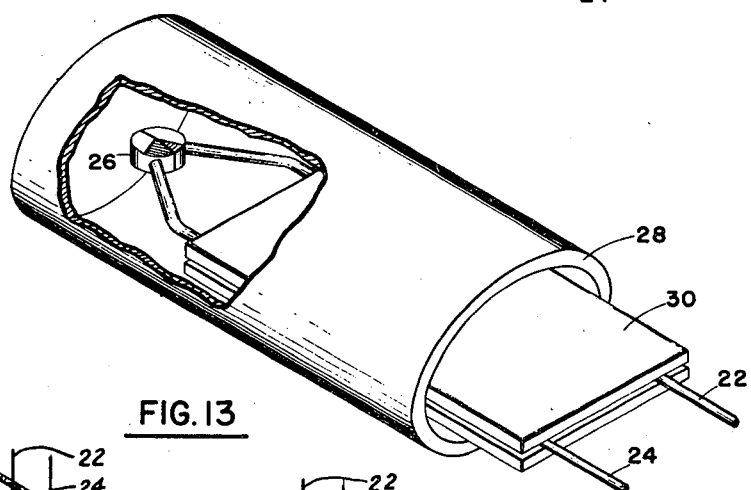
Fig. 13 is an enlarged isometric view of an embodiment of the invention using a tube, shown here before final flattening.

Another method of accomplishing the construction as illustrated in greatly enlarged Figs. 13 and 14 is to use a flattened, closed tube 28 of low emissivity material instead of sheet. Strips of insulating material 30 are introduced with the junction 26 and wires 22, 24, and the tube is then flattened still further to make the desired thermal contact and to provide mechanical stability to the unit. Obviously this method of construction eliminates the need for closing any seams as a final step in the construction, and thus eliminates the possibility that a seam may open up in service.

In designing a pyrometer for use such as measuring hot-gas temperature in gas turbines and turbo-jet engines, small size, ruggedness and ease of installation are of prime necessity. Shielded junctions of the type described above have proven effective for applications such as these.

Figures 8 and 10 illustrate the type of pyrometer 26 with added mechanical protection and with a stem which can be equipped with mounting means. The outer metal shield 32 prevents damage during handling or service. The illustration of these figures is for typical high temperature application.

The thermocouple wires are Chromel and Alumel, the insulating tube 34 is two hole porcelain, the radiation shield 28 is silver, the insulation around wires above the junction (not shown) is mica and the mechanical shields 32 and 36 are steel, though it is not intended that devices for all purposes will employ these same materials.

It is at once apparent that a pyrometer of this sort can be introduced and removed readily through a small and simple opening. The dimensions of the illustrations may be modified as dictated by the available space and particular needs, without affecting the accuracy of the instrument.

To show the effectiveness of the pyrometer above described, a direct comparison of four different instruments has been made under highly unfavorable conditions of low gas velocity and low wall temperature. These results are shown in the following table:

*Observed gas temperature*

| True Temp. | Shielded Junction Figure 6 | Pyrometer Figure 8 | Unshielded Junction | Wall Temp. |
|---|---|---|---|---|
| 1,400 | 1,392 | 1,393 | 1,325 | 900 |
| 1,200 | 1,194 | 1,195 | 1,163 | 900 |
| 1,000 | 995 | 996 | 980 | 900 |

The true gas temperature was measured with a complex laboratory standard consisting of a junction at the center of two concentric radiation shields, the inner one of which is made of silver and is electrically heated. The junction of Figure 6 is in error by only 5 to 8° F., that of Figure 8 from 4 to 7° F. and the unshielded junction from 16 to 68° F. Thus the small shielded junctions are shown to reduce greatly the error from radiation loss, and the space that they occupy is very much less than that required for the laboratory standard.

While the above description has been confined to a structural method of shielding base-metal thermocouples to render them more accurate in indicating the temperature of a gas stream, it is not desired to be limited strictly thereto as the method of construction is equally applicable to the shielding noble metal thermocouples such as platinum-rhodium combinations etc. The shielded thermocouples are equally useful in the determination of temperatures wherever there is a heat loss or gain by radiation from the thermocouple junction. Such modifications are within the scope of this invention to the extent as defined by the herewith appended claims.

The invention described herein may be manufactured and used by or for the Government of the United States of America for governmental purposes without the payment of any royalty thereon or therefor.

I claim:

1. A pyrometer element adapted to indicate the temperature of gases with substantial accuracy comprising a thermocouple junction of two different refractory metal wires, a layer of noble metal having low emissivity in direct contact with and closely wrapped around the thermocouple junction and extending beyond the junction along the wires, a thin layer of electrical insulating material interposed between the wires and the layer of noble metal having low emissivity, a porcelain tube provided with two parallel longitudinal channels adapted to separately support the wires in the channels and to insulate them from each other, a metallic tube surrounding the porcelain tube and a larger metallic tube adapted to threadedly engage the other metallic tube, to extend around the thermocouple junction the said larger metallic tube having means therein to permit the passage of gas through the larger tube and across the thermocouple junction.

2. A pyrometer element of relatively small physical dimensions adapted to indicate the temperature of gases with substantial accuracy comprising a thermocouple junction of two different base-metal wires, a layer of silver in direct contact with and closely fitting around the thermocouple junction and extending beyond the junction along the wires, a thin sheet of mica interposed between the wires and the layer of silver, a porcelain tube provided with two parallel longitudinal channels adapted to separately support the wires in the channels and to insulate them from each other, a metallic tube surrounding the porcelain tube and the thermocouple junction said metallic tube having means therein to permit the passage of gas through the metallic tube and across the thermocouple junction.

3. A shielded thermocouple for use in gas streams comprising a thermocouple junction of base metals shaped substantially into a thin disc, leads to the junction, a covering of a noble metal having low thermal emissivity closely surrounding and in good thermal contact with the junction and extending beyond said junction along the leads, and a layer of insulating material interposed between the leads and the noble metal covering whereby the thermocouple is shielded against thermal radiation.

4. A shielded thermocouple for use in gas streams comprising a thermocouple junction of base metals shaped substantially into a thin disc, leads to the junction, a covering of silver closely surrounding and in good thermal contact with the junction and extending beyond said junction along the leads, and a layer of insulating material interposed between the leads and the silver covering whereby the thermocouple is shielded against thermal radiation.

5. A shielded thermocouple for use in gas streams comprising a thermocouple junction of base metals shaped substantially into a thin disc, leads to the junction, a covering of platinum closely surrounding and in good thermal contact with the junction and extending beyond said junction along the leads, and a thin sheet of mica interposed between the leads and the platinum covering whereby the thermocouple is shielded against thermal radiation.

ANDREW I. DAHL.

REFERENCES CITED

The following references are of record in the file of this patent:

UNITED STATES PATENTS

| Number | Name | Date |
| --- | --- | --- |
| 1,993,063 | Klopsteg | Mar. 5, 1935 |
| 2,012,112 | States | Aug. 20, 1935 |
| 2,186,707 | Ray | Jan. 9, 1940 |
| 2,374,377 | Percy | Apr. 24, 1945 |
| 2,414,370 | Floyd | Jan. 14, 1947 |

FOREIGN PATENTS

| Number | Country | Date |
| --- | --- | --- |
| 52,068 | Sweden | June 28, 1922 |

OTHER REFERENCES

Dahl, A. I., Instruments, March, 1947, pages 258, 260.

Barnes et al., J. Opt. Soc. Am., October, 1947, page 805.

Roeser et al., Temperature, Am. Inst. Physics (1941), page 1314.

Mullikin, H. F., Temperature, Am. Inst. Physics (1941), page 777.